United States Patent Office 3,063,308
Patented Nov. 13, 1962

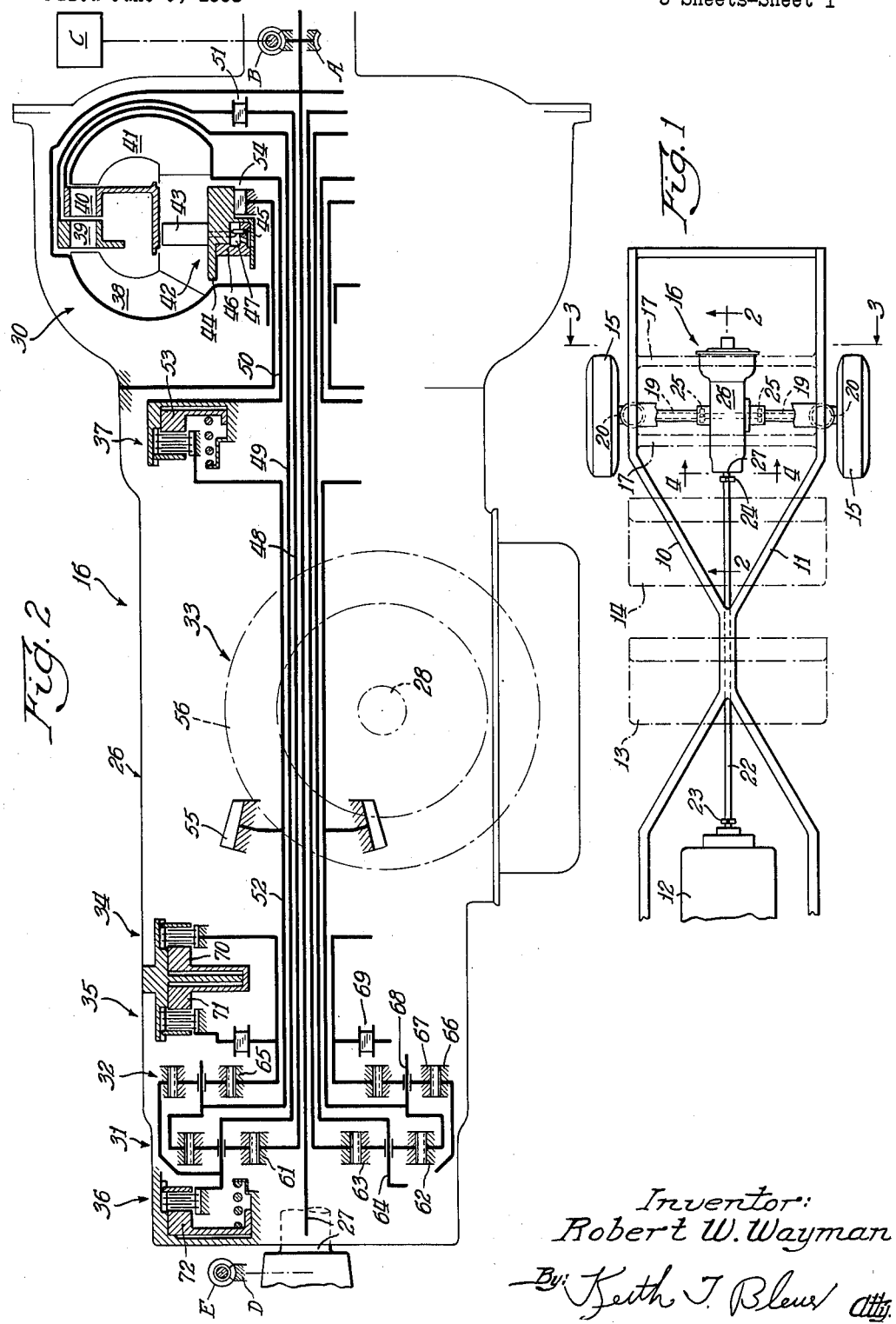

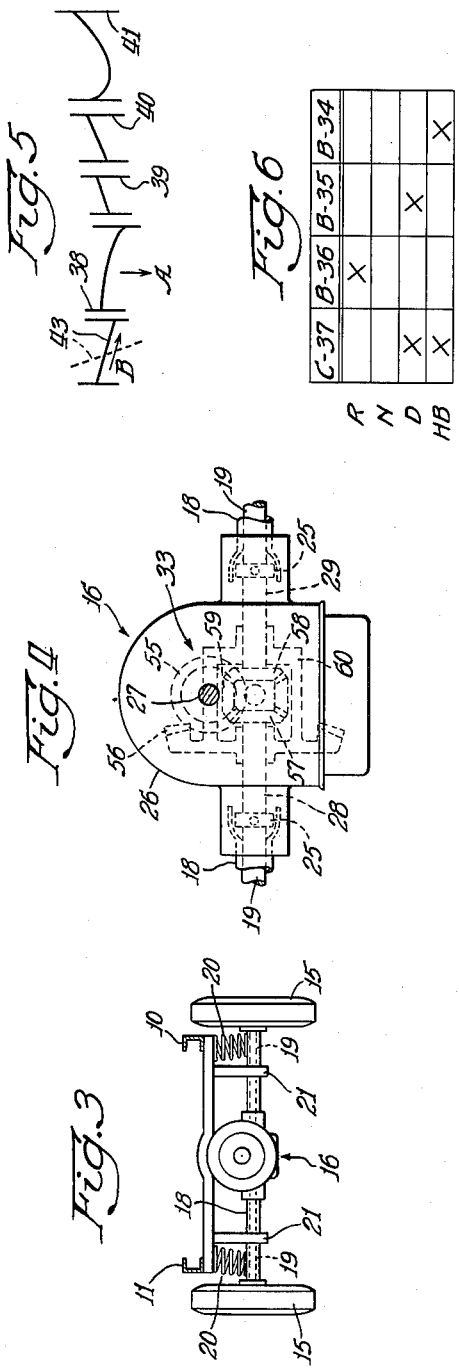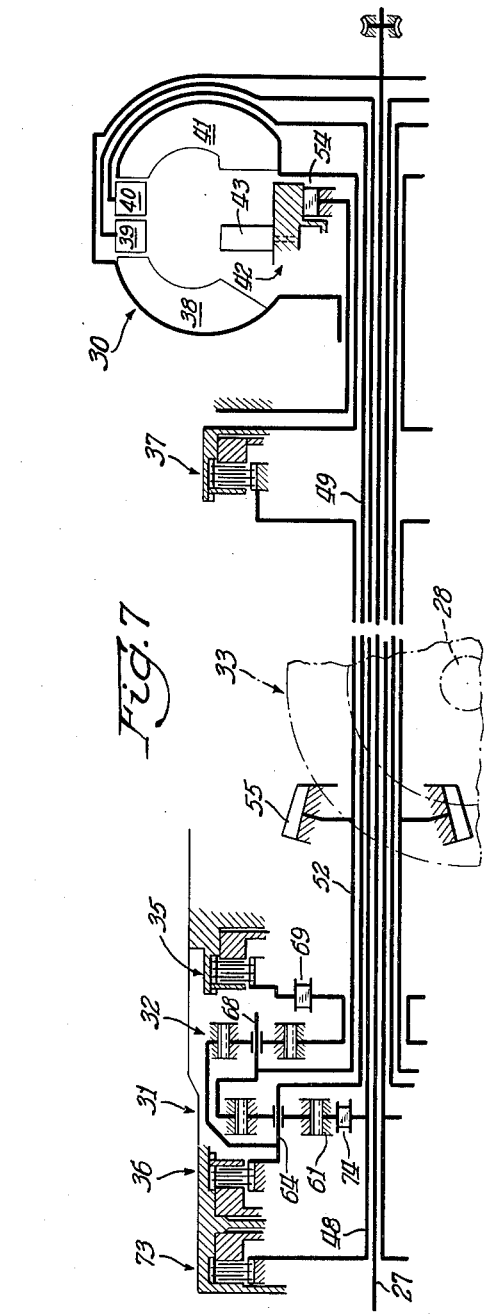

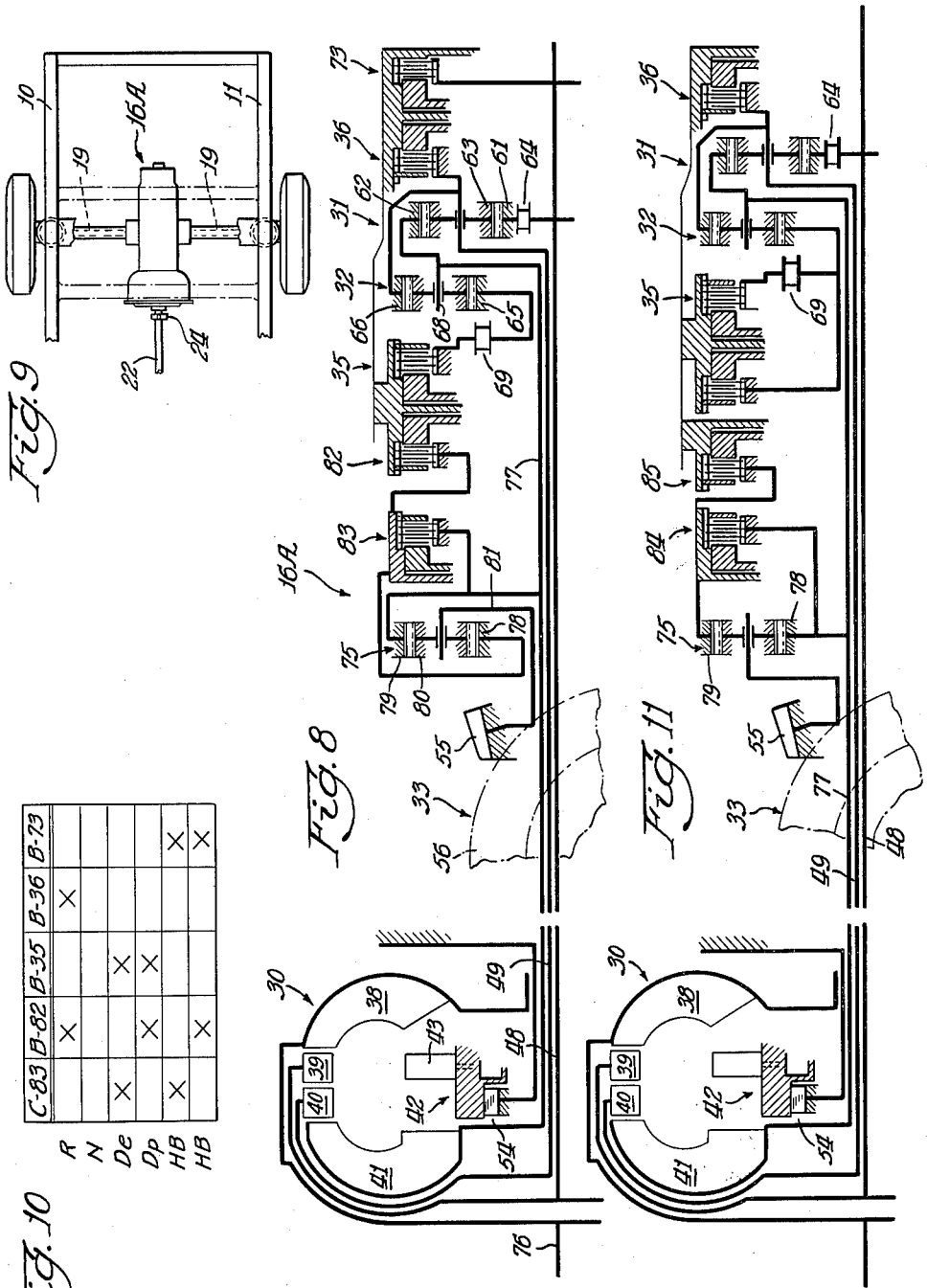

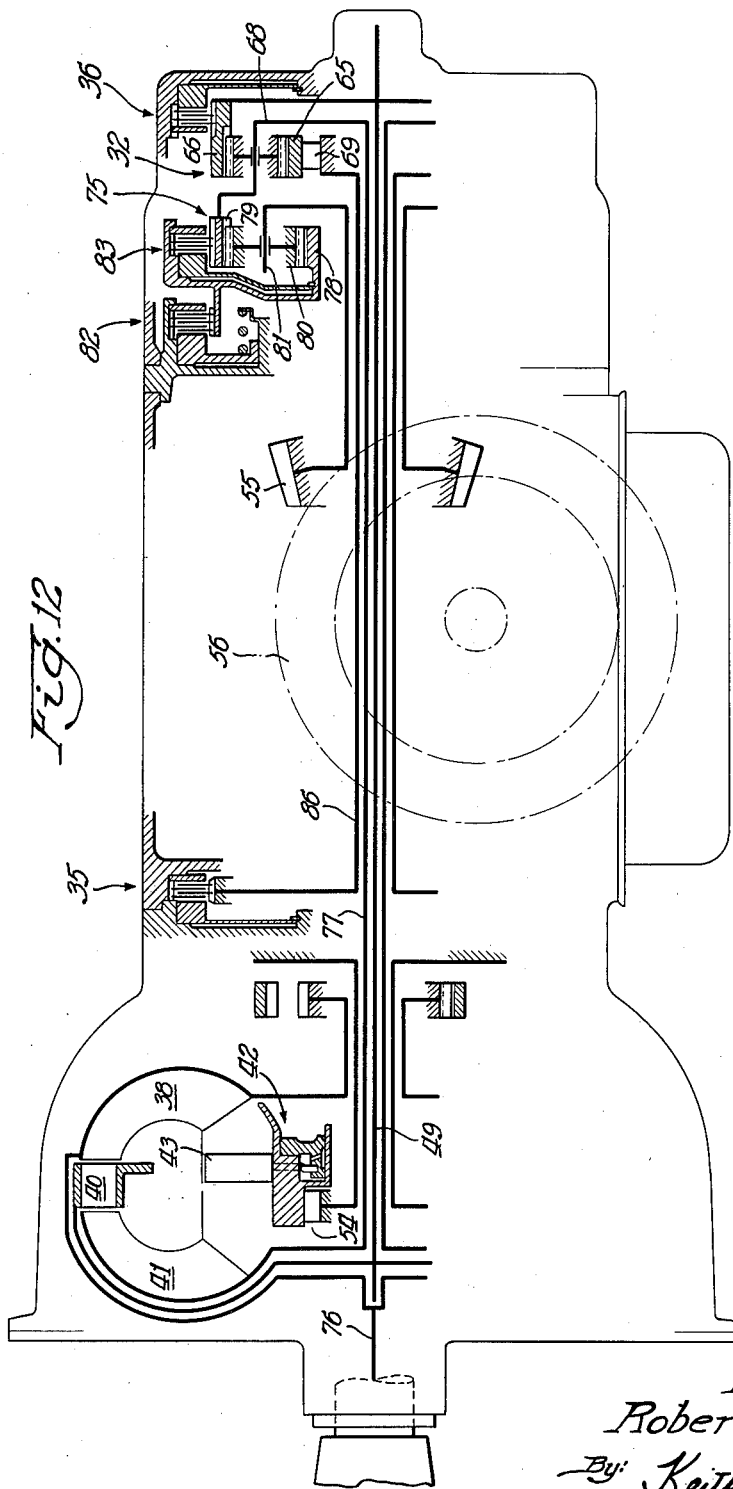

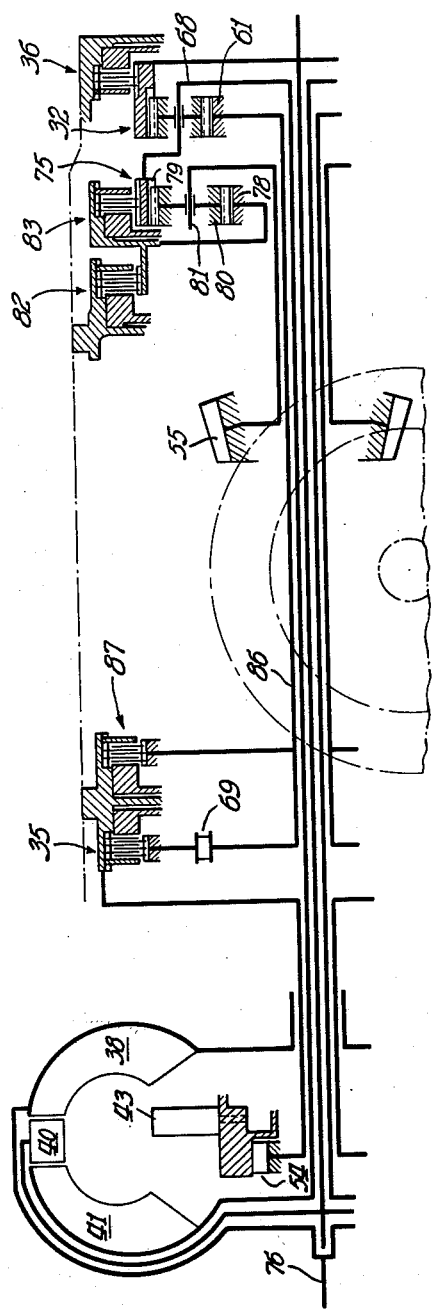

3,063,308
REAR MOUNTED TRANSMISSION
Robert W. Wayman, Muncie, Ind., assignor to Borg-Warner Corporation, Chicago, Ill., a corporation of Illinois
Filed June 9, 1958, Ser. No. 741,210
11 Claims. (Cl. 74—677)

My invention relates to automotive vehicles and more particularly to transmissions for said vehicles.

This application is a continuation in part of my application for "Rear Mounted Transmission," S.N. 725,123, filed March 31, 1958, now abandoned.

It is an object of the present invention to provide an improved location and disposition of a transmission in an automotive vehicle. In particular, my invention contemplates that, instead of placing the transmission in its usual location immediately behind the vehicle engine located in the front of the vehicle, the transmission be instead placed in the rear of the vehicle, approximately between the rear driving road wheels of the vehicle. Still more particularly, it is a feature of the invention that the transmission be placed in the vehicle with its longitudinal axis extending longitudinally of the vehicle, with a differential being located approximately midway between the ends of the transmission.

The transmission preferably comprises a hydraulic torque converter and planetary gearing, and it is an object of the invention to compactly dispose the transmission and differential with respect to each other in a single assembly, in particular with the differential located between the torque converter and the planetary gearing.

It is another object of the invention to provide an improved transmission of the hydraulic torque converter—gearing type, with the torque converter having a plurality of turbine or driven elements that successively take up the drive. It is a further object of the invention to provide an improved transmission of this type that not only has three such turbine elements but in addition comprises change speed gearing, so as to provide a high speed ratio economy range and also a low speed ratio performance range in both of which all three turbine elements are at times operative.

The invention consists of the novel constructions, arrangements and devices to be hereinafter described and claimed for carrying out the above stated objects and such other objects as will be apparent from the following description of preferred embodiments of the invention, illustrated with reference to the accompanying drawings, wherein:

FIG. 1 is a plan view of the chassis of an automobile in which is installed a torque converter type transmission and differential assembly embodying the principles of the invention;

FIGS. 2, 3, and 4 are sectional views on enlarged scales taken respectively on lines 2—2, 3—3, and 4—4 of FIG. 1;

FIG. 5 is a schematic sectional view of the vanes of the torque converter of the transmission;

FIG. 6 is a table indicating the various brakes and clutches of the transmission which are engaged for various power trains provided by the transmission;

FIG. 7 is a sectional, schematic view of another embodiment of the transmission;

FIG. 8 is a schematic sectional view of another embodiment of the transmission of the invention;

FIG. 9 is a partial plan view of an automobile chassis indicating the manner in which the FIG. 8 transmission embodiment is disposed in the vehicle;

FIG. 10 is a table indicating the various brakes and clutches of the FIG. 9 embodiment that are engaged for providing various power trains through the transmission;

FIG. 11 is a schematic sectional view of still another embodiment of the transmission;

FIG. 12 is a schematic sectional view of another embodiment of the transmission of the invention;

FIG. 13 is a table indicating the various brakes and clutches of the FIG. 12 embodiment that are engaged for providing various power through the transmission;

FIG. 14 is a schematic sectional view of still another embodiment of the transmission of the invention; and FIG. 15 is a table indicating the various brakes and clutches of the FIG. 14 embodiment that are engaged for providing various power trains through the transmission.

Like characters of reference designate like parts in the several views.

Referring now to FIG. 1, the automobile chassis illustrated therein may be seen to comprise side frame members 10 and 11 which are joined intermediate their ends to form an X-type of vehicle frame. The conventional automobile engine 12 is mounted adjacent the front end of the chassis, and the usual passenger seats 13 and 14 are fixed with respect to the chassis in the conventional manner. Rear driving road wheels 15 are disposed adjacent the rear end of the chassis, and a transmission-differential assembly 16 is disposed between the road wheels 15. The chassis is provided with a plurality of cross frame members 17, and the transmission-differential assembly 16 is supported with respect to the chassis by means of these cross frame members.

A pair of axle housings 18 extend from the sides of the assembly 16 and are swingably disposed by any suitable mechanism with respect to the assembly 16 as to move in a vertical transverse plane. Each of the road wheels 15 is rotatably carried by a driving axle 19 disposed in one of the housings 18, and a coil spring 20 is disposed between each of the axle housings 18 and a portion of the vehicle chassis so as to swingingly mount the wheels with respect to the chassis. A limit strap 21 extends around each of the axle housings 18 and is fixed to the chassis adjacent the upper end of the adjoining spring 20 for holding the axle housing 18 against any other than vertical movement in the strap 21. A propeller shaft 22 drivingly connects the engine 12 and the assembly 16, and universal joints 23 and 24 respectively connect the shaft 22 with the engine 12 and the assembly 16. Each of the driving axles 19 is connected by means of a universal joint 25 with the assembly 16 for driving the road wheels 15 carried by the axle housing 18 but yet allowing vertical movement of the road wheels with respect to the vehicle chassis.

The assembly 16 (see FIG. 2) comprises a casing 26. An input shaft 27 is journaled in the casing at one end thereof and extends completely through the transmission from one end to the other. The assembly has a pair of output shafts 28 and 29 (see FIG. 4) which are journaled therein intermediate the length of the shaft 27 and at right angles to the shaft 27. The shaft 27 is connected by means of the universal joint 24 with the propeller shaft 22, and each of the shafts 28 and 29 is connected by one of the universal joints 25 to the corresponding driving axle 19.

The transmission comprises, in general, a hydraulic torque converter 30, a pair of planet gear sets 31 and 32, a hypoid ring and pinion and differential gearing assembly 33, friction brakes 34, 35, and 36, and a friction clutch 37.

The hydraulic torque converter 30 comprises a fluid pump or impeller 38; first, second and third turbine or driven elements 39, 40 and 41; and a stator or reaction element 42. The elements 38, 39, 40 and 41 all have blades disposed in a toroidal fluid circuit, and the stator 42 is provided with blades 43 also disposed in the toroidal fluid circuit. The shapes of the blades at their mean flow lines are shown in FIG. 5. The blades 43 are pivotally mounted with respect to a support ring 44, and each is provided with a crank 45 having its end disposed in an opening provided in a piston 46. The piston 46 is slidably disposed within an annular cavity 47 formed in the ring 44, so that when pressure is supplied within the cavity 47, th pressure moves the piston 46 and turns the stator blades 43.

The impeller 38 is connected to the shaft 27; the first turbine 39 is connected to a sleeve shaft 48 disposed over the shaft 27; the second turbine 40 is connected to a second sleeve shaft 49 disposed over the shaft 48; and the third turbine 41 is connected to a third sleeve shaft 50 disposed over the shaft 49. A one way clutch 51 of any suitable construction is provided between the first turbine 39 and the shaft 48, as shown. The friction clutch 37 is provided between the shaft 50 and a shaft 52 disposed over the shaft 49. The clutch 37 is fluid pressure operated and comprises a fluid pressure actuated piston 53 for engaging the clutch 37. A one-way brake 54 of any suitable construction is provided for the stator 42 for preventing it from rotating in the reverse direction (that is, the direction opposite to which the impeller 38 rotates).

A transmission output gear 55 is fixed on the shaft 52. The gear 55 is in mesh with a ring gear 56 constituting a part of the differential 33. The differential also comprises bevel gears 57 and 58 fixed respectively on the shafts 28 and 29 and a bevel gear 59 rotatably disposed on a carrier 60 on which the gear 56 is fixed.

The planet gear set 31 comprises a sun gear 61, a ring gear 62, planet gears 63 in mesh with the sun and ring gears and a planet gear carrier 64. The sun gear 61 is fixed on the shaft 48; the carrier 64 is fixed on the shaft 49; and the ring gear 62 is fixed on the shaft 52.

The planet gear set 32 comprises a sun gear 65, a ring gear 66, planet gears 67 in mesh with the sun and ring gears and a planet gear carrier 68. The carrier 68 is fixed with respect to the ring gear 62 and the shaft 52. The ring gear 66 is connected to the carrier 64, and the brake 36 is effective on both the carrier 64 and the ring gear 66. The brake 34 is directly effective on the sun gear 65, and the brake 35 is connected in series with a one-way brake device 69, which is of any suitable construction, with the sun gear 65. All three of the brakes 34, 35, and 36, are fluid pressure engaged, fluid pressure actuated pistons 70, 71 and 72 being respectively provided for these brakes.

In operaiton, the transmission provides a forward drive range, a reverse drive and a hill braking condition. For neutral conditions, all of the clutches and brakes of the transmission are disengaged.

For drive range, the clutch 37 and the brake 35 are engaged (see FIG. 6). The impeller 38 is driven from the input shaft 27 of the transmission and impels fluid toroidally successively through the turbines 39, 40 and 41 and thence through the stator 42 back into the impeller 38. As will be noted from FIG. 5 showing the shapes of the blades of the torque converter elements, the blades of the turbines 39, 40 and 41 are so disposed as to direct fluid flowing from the turbines in a direction opposite to that in which the impeller 38 rotates, this direction of rotation being indicated by the arrow A and the direction of fluid flow being indicated by the arrow B. The stator blades 43 are disposed to direct fluid into the impeller 38 in the same direction as the impeller rotaates, and the blades 43 may be rotated by the piston 46 into their dotted line positions as indicated in FIG. 5 to give increased torque conversion and allow the engine speed to increase so that the engine produces a greater power output.

Initially, the first turbine 39 drives the shaft 48 and the sun gear 61 fixed on the shaft through the one-way clutch 51. The two planetary gear sets 31 and 32 each have two elements interconnected, the ring gear 62 being connected to the carrier 68 and the carrier 64 being connected to the ring gear 66, and the two sets 31 and 32 thus function as a single gear system. The sun gear 65 functions as the reaction element of the system, and it is braked through the one-way brake 69 and the friction brake 35, so that the gear sets 31 and 32 drive the shaft 52 and thereby the output gear 55 of the transmission at a reduced speed. Torque conversion thus takes place both in the hydraulic torque converter 30 and in the gear sets 31 and 32, and under these conditions the stator 42 is stationary, being held against reverse rotation by the one-way brake 54, so that the hydraulic torque converter 30 converts torque. As previously mentioned, the stator blades 43 may be rotated into their dotted line positions as seen in FIG. 5 to increase the torque conversion and increase the engine speed.

The gear 55 drives the ring gear 56 with which it is in mesh and thereby drives the carrier 60 of the differential 33. The bevel gears 57 and 58 are driven through the bevel gear 59 to thereby drive the output shafts 28 and 29.

As the speed of the vehicle and the speed of the first turbine 39 increase, the second turbine 40 begins to take the drive, exclusive of the first turbine 39; and the turbine 40 drives the ring gear 66 through the sleeve shaft 49 and carrier 64. The sun gear 65 continues to function as a reaction element, in this case, particularly for the gear set 32; and the planet gears 67 and carrier 68 planetate around the sun gear 65 and drive the output gear 55 and thereby the vehicle at a higher but reduced speed ratio. In this drive, the torque converter 30 and the gear set 32 both function to multiply torque, and under these conditions, the one-way engaging device 51 releases, and the first turbine floats or idles.

As the speed of the vehicle and of the gear 55 increases still further, the third turbine 41 takes over the drive, and it drives the output gear 55 directly through the shafts 50 and 52 and the clutch 37. Under these conditions, both the one-way devices 51 and 69 are released. The torque converter 30 at this time may be converting torque, assuming that there is still a relatively great torque output from the vehicle engine; however, when the torque output of the engine and the speed of the vehicle respectively decrease and increase sufficiently, the stator 42 begins to rotate in the forward direction, with a release of the one-way brake 54, the direction of fluid impingement on the blades 43 changing from the reverse direction to the forward direction. At this time, the torque converter 30 is in its coupling range, and there is no further torque conversion within the hydraulic unit 30.

In order to obtain a hill braking condition, the clutch 37 and the brake 34 are engaged. The brake 34 simply prevents the sun gear 65 from rotating freely in the forward direction which ordinarily occurs when the third turbine 41 drives; and the brake 34 is thus effective holds the transmission in its second speed drive. In addition, the first turbine 39 is drivingly interconnected through the gear set 31 with the gear 55 at a certain fixed ratio, since the elements of the gear sets are interconnected as above described. The one-way clutch 51 is engaged under these conditions, and the first turbine 39 thus dynamically brakes rotation of the carrier 68 and output gear 55 to provide additional braking action.

For reverse drive, the brake 36 is engaged. Under these conditions, the first turbine 39 drives the sun gear 61 through the shaft 48 and one-way device 51; and the carrier 64, being held stationary by the brake 36, causes the planetary gear set 31 to function to drive its ring gear 62 in the reverse direction. The ring gear 62 is connected with the shaft 52 on which the gear 55 is fixed, and the output gear 55 is correspondingly driven in the reverse direction, with torque multiplications taking place both in the torque converter 30 and in the gear set 31.

Additional torque for reverse drive may be obtained by, in addition, applying the clutch 37. As is apparent, the brake 36 functioning through the carrier 64 and shaft 49 holds the second turbine 40 stationary, and such braking of the turbine 40 causes the fluid within the torque converter 30 to provide a torque in the reverse direction on the third turbine 41. The third turbine 41 is connected directly through the clutch 37 with the output gear 55, so that this additional reverse torque is applied to the gear 55.

The embodiment of the invention shown in FIG. 7 is identical with that shown in FIG. 2, except that the hill brake 34 has been deleted, and a different hill brake 73 has been added; and, in addition, the one-way clutch 51 has been deleted, and a one-way clutch 74 has been added instead. The one-way clutch 74 is disposed between the shaft 48 and the sun gear 61, and the brake 73 is effective on the shaft 48.

The FIG. 7 transmission embodiment operates in the same manner as the FIG. 2 embodiment, except that the hill braking condition is different. In order to obtain hill braking condition in the FIG. 7 embodiment, the brake 73 and the clutch 37 are engaged. The brake 73, being effective on the shaft 48 holds the first turbine 39 from rotation, and the stationary turbine 39 tends to force backward rotation of the third turbine 41 connected through the clutch 37 with the output gear 55, thus providing a braking action on the output gear 55 and on the vehicle. This torque on the third turbine 41 is due to the curvature of the blades in the torque converter and is increased by increasing the engine throttle opening to cause the impeller 38 to be driven at higher speeds.

The transmission assembly 16A shown in FIG. 8 is much like the FIG. 7 embodiment but has in addition a third planet gear set 75. The transmission is, however, reversed in the vehicle chassis as compared to the first two embodiments of the invention, the hydraulic torque converter 30 being at the front while the gear sets 31, 32 and 75 are at the rear of the ring gear 56, the disposition of the transmission in the vehicle being as shown in FIG. 9. The impeller 38 of the torque converter 30 is driven from an input shaft 76 which is connected to the universal joint 24, the input shaft 76 being coaxially disposed with respect to the shaft 48 connecting the first turbine 39 and the sun gear 61 through the one-way engaging clutch 64. In the FIG. 8 embodiment, a solid shaft 77 is used to provide a permanent connection between the carrier 68 and the third turbine 41, the clutch 37 being dispensed with.

The third planet gear set 75 comprises a sun gear 78, a ring gear 79, planet gears 80 in mesh with the sun and ring gears and a planet gear carrier 81. The carrier 81 is connected directly to the output gear 55. A friction brake 82 is provided for the sun gear 78, and a friction clutch 83 is effectively disposed between the sun gear 78 and the ring gear 79.

The planet gear set 75 in the FIG. 8 embodiment in effect is disposed between the carrier 68, ring gear 62 and third turbine 41 (which are the output elements in the FIG. 7 embodiment) on the one hand and the output gear 55 on the other hand and provides either a one to one drive or a reduction drive between these output elements and the output gear 55. The clutch 83 is provided in lieu of the clutch 37 in the FIG. 7 embodiment, and when the clutch along with the brakes in the transmission are disengaged, the transmission is in neutral condition. When the clutch 83 is engaged, it locks up the elements of the gear set 75 so that they all rotate as a unit and so that the planet carrier 68 and ring gear 62, constituting the output elements of the gear sets 31 and 32, are in effect directly connected with the output gear 55 of the transmission.

For reverse drive, the brake 36 is engaged as in the other embodiments (see FIG. 10), and the brake 82 is also engaged, so that the carrier 68 and ring gear 62 are driven in the reverse direction as in the previous embodiments, and the power train thence is through the gear set 75 to the output gear 55. Since the brake 82 is engaged, the gear set 75 further reduces the speed ratio, causing the output gear 55 to be driven at a slower speed in the reverse direction than in the other embodiments.

For forward driving the brake 35 is engaged, similarly as in the other embodiments, and the clutch 83 is engaged to lock up the output gear set 75 and give the same forward drive ratios as described in connection with the other embodiments. This range of drive may be termed an economy range (DE in FIG. 10). If additional torque is required for forward driving, the brake 82 is engaged in lieu of the clutch 83, and the gear set 75 at this time reduces the speed and multiplies the torque, with the carrier 81 and the planet gears 80 planetating around the stationary sun gear 78, being driven by the ring gear 79. This may be termed a performance range (Dp in FIG. 10).

For hill braking condition, the brake 73 and the clutch 83 may be engaged. This hill braking condition is the same as described in connection with the FIG. 7 embodiment in which the clutch 37 and the brake 73 were engaged, inasmuch as the clutch 83 in effect directly connects the third turbine 41 with the output gear 55 (as does the clutch 37), the connection in this case being through the shaft 77, the locked up planetary gear set 75 to the gear 55. An alternate hill braking condition may be obtained by engaging the brake 82 along with the brake 73, and the coaction between the parts is the same except that the third turbine 41 in this case is connected through the speed reducing gearing 75 with the output gear 55, in lieu of being connected directly with the output gear 55 at a one to one ratio.

The FIG. 11 transmission embodiment is the same as the FIG. 8 embodiment except that the sun gear 78, instead of the ring gear 79 is connected to the shaft 77; a clutch 84 is provided in lieu of the clutch 83; and a brake 85 is provided in lieu of the brake 82. The clutch 84 connects the sun gear 78 with the ring gear 79 and thus locks up the gear set 75 in the same basic manner as the clutch 83. The brake 85 is effective on the ring gear 79, and thus when the brake 85 in addition to the brake 35 are engaged to provide a low speed driving range, the output gear 55 is driven at a lower speed than is the case when the brake 82 and the brake 35 are engaged in the FIG. 8 embodiment. The planet gear set 75, as controlled and connected as shown in FIG. 11, thus provides an initial lower starting ratio than when connected and controlled in the manner shown in FIG. 8. The other drives through the FIG. 11 embodiment are the same as in the FIG. 8 embodiment.

The FIG. 12 embodiment is quite similar to the FIG. 8 embodiment with the principal exception being that the first turbine element 39, together with the gear set 31 are depleted, so that only the higher speed drives are provided by the transmission. The FIG. 12 embodiment, similarly to the FIG. 8 embodiment, is provided with a hydraulic torque converter having an impeller 38, turbines 40 and 41 and a stator 42. The transmission comprises the planetary gear sets 32 and 75; and, as in the FIG. 8 embodiment, the planet gear carrier 68 is connected through the shaft 77 with the turbine 41, and the ring gear 66 is connected through the shaft 49 with the turbine 40. The sun gear 65 is braked through the one-way brake device 69 by means of the brake 35. The brake 35 in the FIG. 12 embodiment, instead of being located on the same side of the gear 56 as the gear sets 32 and 75 is instead located on the opposite side of the gear 56, adjacent the torque converter in the front end of the transmission. The brake 35 in the FIG. 12 embodiment is connected through a shaft 86 with the one-way engaging device 69 which in this case is located within the sun gear 65.

Since the brake 35 is moved from between the gear sets 32 and 75, the gear sets may be and are disposed immediately adjacent each other; and it will be noted that, in addition, the brake 36 is disposed on the outer periphery of the ring gear 66, and the clutch 83 is disposed on the outer periphery of the ring gear 79 for shortening the transmission. The brake 82 is disposed forwardly of the gear set 75 instead of between the gear set 75 and the gear set 32.

In operation, the FIG. 12 embodiment provides an economy range in which, as in the FIG. 8 embodiment, the engaging devices 83 and 35 are engaged. The clutch 83 locks up the gear set 75, and the brake 35 brakes the sun gear 65 through the one-way device 69 and the shaft 86. As the speed of the engine and shaft 76 increases, the turbine 40 becomes effective and has substantial torque in the forward direction impressed on it by the fluid in the torque converter. This torque is transferred through the shaft 49 to the ring gear 66 so that the carrier 68 is driven forwardly at a reduced speed, with the sun gear 65 being stationary and acting as the reaction element of the gear set 32. The carrier 68 is connected through the locked up gear set 75 directly to the output gear 55.

The fluid in the torque converter ultimately impresses sufficient torque on the turbine 41 so that the turbine 41 takes the drive and drives the carrier 68 directly. At this time the one-way engaging device 69 releases.

In a performance range, the brake 82 and the brake 35 are engaged, similarly as in the FIG. 8 embodiment, and in this case the drive is the same as in economy range except that the gear set 75 in this case multiplies torque instead of being locked up. The brake 82 holds the sun gear 78 stationary so that it acts as a reaction element, and when the ring gear 79 is driven from the carrier 68, the carrier 81 connected to the output gear 55 is driven at a constant reduced speed with respect to the ring gear 79 due to this functioning of the gear set 75.

Reverse drive is obtained in this embodiment in the same manner as in the FIG. 8 embodiment, namely, by engaging the brakes 82 and 36. The brake 36 holds the turbine 40 from rotation through the shaft 49, and a reverse torque is thus applied on the turbine 41 due to the angularity of the blades of the turbine 40. The turbine 41 is connected through the shaft 77 with the carrier 68 and the ring gear 79, and the ring gear 79 is thus driven reversely. The brake 82 holds the sun gear 78 stationary, and this reverse rotation of the ring gear 79 is thus transferred through the gear set 75 to rotate the carrier 81 and the output gear 55 at a reduced speed reversely.

For hill braking condition, the clutch 83 and the brake 36 are engaged. The clutch 83 locks up the gear set 75, and the brake 36 is connected through the shaft 49 with the turbine 40 and holds the turbine 40 from rotation. This causes the fluid within the converter to impinge on the turbine 41 in the reverse direction, that is, in the direction tending to move the turbine 41 rearwardly. The turbine 41 is connected through the carrier 68 and the locked up gear set 75 with the output gear 55, and therefore there is reverse torque applied on the gear 55 against its forward rotation (rotation in a direction to drive the vehicle forwardly), and the vehicle is thus braked from forward movement. The engine braking effect can be increased by opening the throttle of the engine to increase the volume of fluid flow within the toroidal fluid path within the fluid converter.

The FIG. 14 embodiment is the same as the previously described embodiment except that the one way clutch 69 has been placed on the shaft 86, and a friction brake 87 has been added to the shaft 86 between the clutch 69 and the sun gear 61.

The FIG. 14 embodiment provides the same drives as in the previously described embodiment, except that in the FIG. 14 embodiment a hill braking condition is obtained by engaging the brake 82 and the brake 87. The drive through the transmission is the same as in the D$p$ condition except that the shaft 86 and the sun gear 61 are braked in both directions rather than in just the reverse direction, inasmuch as the brake 87 is directly effective on the shaft 86 while the brake 35 is effective on the shaft 86 through the one way device 69. The gear set 32 thus remains in its speed changing condition with the sun gear 61 stationary; and the transmission thus remains, in effect, in its low speed ratio in D$p$ range to provide a hill braking condition.

My improved transmissions are advantageously in position between the rear driving road wheels 15, with approximately half the transmission being positioned to the rear of the axles 19 and the other half positioned to the front of the axles 19. The torque converter may be positioned either in the front of the axles or in the rear of the axles as shown. The illustrated transmission embodiments advantageously provide a gradually increasing drive to the wheels 15 with changes in ratio being hardly perceptible due to the fact that the plurality of turbines 39, 40, and 41 consecutively supplant each other in changing the drive. All of the transmissions provide suitable hill braking conditions for preventing unrestrained movement of the vehicle forwardly when descending steep grades.

I wish it to be understood that the invention is not to be limited to the specific constructions and arrangements shown and described, except only insofar as the claims may be so limited, as it will be understood by those skilled in the art that changes may be made without departing from the principles of the invention.

I claim:

1. In a transmission, the combination of a drive member, a driven member, a hydrodynamic coupling device driven by said drive member and having first and second turbines or driven parts, first and second planetary gear sets each having a series of three intermeshed elements, two of said elements of one of said gear sets being respectively connected with two of said elements of said other gear set to form a single acting gear system, means for connecting said first turbine with the third element of said first gear set, means for braking the third element of said second gear set, means for connecting one pair of said interconnected elements of said gear sets with said driven member so that said first turbine is initially effective to drive said driven member in a first direction through said gear sets at a low speed ratio, and means for directly connecting said second turbine with said driven member to provide a high speed drive in said first direction to said driven member.

2. In a transmission, the combination of a drive member, a driven member, a hydrodynamic coupling device driven by said drive member and having first and second turbines or driven parts, first and second planetary gear sets each having a series of three intermeshed elements, two elements of one of said gear sets being respectively connected with two elements of said other gear set to form a single acting gear system, means for connecting said first turbine with the third element of said first gear set, a brake for the third element of said second gear set, means for connecting a pair of said interconnected elements of said sets to said driven member for providing a low speed drive in a first direction from said first turbine to said driven member when said brake is engaged, and means for directly connecting said second turbine with the other two interconnected elements of said gear sets for providing a higher speed drive in said first direction to said driven member when said second turbine becomes effective to drive as the speed of said drive member increases.

3. In a transmission, the combination of a drive member, a driven member, a hydraulic torque converter driven by said drive member and having first and second and third turbines or driven parts, first and second planetary gear sets each having first and second and third elements intermeshing in series, said first and second elements of said two gear sets being respectively interconnected to form a single acting gear system, means including a one-way clutch for connecting said first turbine to said third element of said first gear set, a one-way braking mechanism effective on the third element of said second gear set, means connecting said second elements of said two gear sets with said driven member for providing a low speed drive from said first turbine to said driven member through said gear sets when said one-way braking mechanism is effective, means for directly connecting said second turbine with said first elements of said two gear sets whereby said second gear set is effective to drive said driven member at a higher speed when said second turbine becomes effective to drive at higher speeds of said drive member and with an overrunning of said one-way clutch, and means directly connecting said third turbine with said driven member for providing a higher speed drive to said driven member with an overrunning of said one-way braking mechanism as the speed of said drive member increases still further.

4. In a transmission, the combination of a drive member, a driven member, a hydraulic torque converter driven by said drive member and having first and second and third turbines or driven parts, first and second planetary gear sets each having a sun gear and a ring gear and a planet gear in mesh with said sun and ring gears and a carrier for the planet gear, said carrier of said first set being connected with said ring gear of said second set, said ring gear of said first set being connected to said carrier of said second set, one-way braking mechanism for said sun gear of said second set, means including a one-way clutch for connecting said first turbine with said sun gear of said first set, means for connecting said carrier of said second set with said driven member so that said first turbine is effective to drive said driven member when said one-way braking mechanism is effective, means connecting said second turbine with said carrier of said first set so that said second turbine is effective to drive said driven member through said second set as the speed of said drive member increases and with an overrunning of said one-way clutch, and a clutch for connecting said third turbine with said driven member to provide a high speed drive to the driven member with an overrunning of said braking mechanism.

5. In a transmission, the combination of a drive member, a driven member, a hydrodynamic coupling device driven by said drive member and having first and second turbine or driven parts, first and second planetary gear sets each having first and second and third elements, said first elements of said two gear sets being connected together and said second elements of said gear sets being connected together to form a single acting gear system, a brake for said third element of said second gear set, means for connecting said first turbine with said third element of said first gear set, means for connecting said driven member with said second elements of said two sets so that said first turbine is effective to drive said driven member at a low speed through said two gear sets when said brake is engaged, means for directly connecting said second turbine with said first elements of said two gear sets whereby said second turbine when it becomes effective on increasing speed of said drive member is effective to drive said driven member at a higher speed, and a brake for said first elements of said two gear sets whereby said first turbine is effective to drive said driven member in the reverse direction through said first gear set.

6. In a transmission, the combination of a drive member, a driven member, a hydrodynamic coupling device driven from said drive member and having first and second and third turbines or driven parts, first and second planetary gear sets each having a series of three intermeshed elements, first and second gear set element connecting means connecting two of said first gear set elements respectively to two of said second gear set elements to form a single acting gear system, means for connecting said first turbine with the third element of said first gear set, means connecting said second turbine to one of said first and second gear set element connecting means, means for braking the third element of said second gear set so that said first turbine initially drives said driven member through said gear sets at a low speed ratio and said second turbine subsequently drives said driven member at a higher ratio as the speed of said drive member increases, means for connecting said third turbine directly with said driven member so that the third turbine subsequently drives said driven member in a high speed drive, and means for braking said first turbine whereby said third turbine tends to rotate in the reverse direction so as to produce a dynamic braking effect on the forward rotation of said driven member.

7. In a transmission, the combination of a drive member, a driven member, a hydraulic torque converter having first and second and third turbines or driven parts and an impeller and a stator or reaction element, said impeller being driven by said drive member, said impeller and stator and turbine having vanes which are disposed in a toroidal fluid circuit with the fluid from said impeller passing successively through said first and second and third turbines, the vanes of said turbines being disposed to direct fluid backwardly in the opposite direction from the direction in which said impeller discharges the fluid, first and second planetary gear sets each having a series of three intermeshed elements, first and second gear set element connecting means connecting two of said first gear set elements respectively to two of said second gear set elements to form a single acting gear system, means for connecting said first turbine with the third element of said first gear set, means connecting said second turbine to one of said first and second gear set element connecting means, means for braking the third element of said second gear set so that said first turbine initially drives said driven member at a low speed ratio through the gearing and said second turbine subsequently drives said driven member at a higher speed ratio through said gearing as the speed of said drive member increases, means for directly connecting said third turbine with said driven member for driving said driven member at a high speed ratio, and a brake for said first turbine for causing a backward torque to be impressed by the fluid of the converter on said third turbine so that the third turbine provides a braking action on said driven member.

8. In a transmission, the combination of a drive member, a driven member, an intermediate member, a hydrodynamic coupling device driven by said drive member and having first and second turbines or driven parts, first and second planetary gear sets each having a series of three intermeshed elements, first and second gear set element connecting means connecting two of said first gear set elements respectively to two of said second gear set elements to form a single acting gear system, means for connecting said first turbine with the third element of said first gear set, means connecting said second turbine to one of said first and second gear set element connecting means, means for braking the third element of said second gear set so that said first turbine initially drives the intermediate member at a low speed ratio through said gearing and said second turbine subsequently drives said intermediate member at a higher ratio as the speed of said drive member increases, and multi-ratio gear mechanism between said intermediate member and said driven member for driving said driven member at a plurality of different ratios with respect to said intermediate member.

9. In a transmission, the combination of a drive member, a driven member, an intermediate member, a hydraulic torque converter driven by said drive member and comprising first and second and third turbines or driven parts, first and second planetary gear sets each having a series of three intermeshed elements, first and second gear set element connecting means connecting two of said first gear set elements respectively to two of said second gear set elements to form a single acting gear system, means for connecting said first turbine with the third element of said first gear set, means connecting said second turbine to one of said first and second gear set element connecting means, means for braking the third element of said second gear set whereby said first turbine initially drives said intermediate member at a low speed ratio and said second turbine subsequently drives said intermediate member at a higher speed ratio as the speed of said drive member increases, means connecting said intermediate member and said third turbine so that said third turbine is subsequently effective to drive said intermediate member at a high speed ratio as the speed of said drive member increases still further, and a second planetary gear system for selectively providing two different speed ratio drives between said intermediate member and said driven member.

10. In a transmission, the combination of a drive member, a driven member, an intermediate member, a hydrodynamic coupling device driven by said drive member and having first and second turbines or fluid driven elements, first and second planetary gear sets each having a series of three intermeshed elements, first and second gear set element connecting means connecting two of said first gear set elements respectively to two of said second gear set elements to form a single acting gear system, means for connecting said first turbine with the third element of said first gear set, means connecting said second turbine to one of said first and second gear set element connecting means, means for braking the third element of said second gear set so that said first turbine initially drives said intermediate member at a relatively low speed ratio and said second turbine subsequently drives said intermediate member at a relatively high ratio as the speed of said drive member increases, and multiratio gear mechanism between said intermediate member and said driven member for driving said driven member at a plurality of different ratios with respect to said intermediate member.

11. In a transmission, the combination of a drive shaft, a driven shaft, an output shaft, said drive and driven shafts being coaxially disposed and said output shaft being disposed at an angle with respect to said other shafts, a hydrodynamic coupling device driven by said drive shaft and having first and second turbines or driven elements, first and second planetary gear sets each having a series of three intermeshing elements, first and second gear set element connecting means connecting two of said first gear set elements respectively to two of said second gear set elements to form a single acting gear system, means for connecting said first turbine with the third element of said first gear set, means for connecting said second turbine to one of said first and second gear set element connecting means, means for braking the third element of said second gear set, means for connecting one pair of said interconnected elements of said gear sets with said driven shaft so that said first turbine is initially effective to drive said driven member at a low speed ratio through said gear sets and said second turbine subsequently drives said driven member at a high ratio as the speed of said drive member increases, bevel gearing between said driven shaft and said output shaft, said hydrodynamic coupling device being disposed on one side of said output shaft and bevel gearing and said first and second planetary gear sets being disposed on the other side of said output shaft and bevel gearing.

References Cited in the file of this patent

UNITED STATES PATENTS

| | | |
|---|---|---|
| 2,232,154 | Wagner | Feb. 18, 1941 |
| 2,328,141 | Haltenberger | Aug. 31, 1943 |
| 2,519,022 | Burtnett | Aug. 15, 1950 |
| 2,657,592 | Burnett | Nov. 3, 1953 |
| 2,758,488 | Calvo | Aug. 14, 1956 |
| 2,893,266 | Kelly | July 7, 1959 |
| 2,932,989 | Winchell | Apr. 19, 1960 |